(12) United States Patent
Lee et al.

(10) Patent No.: US 11,855,783 B2
(45) Date of Patent: Dec. 26, 2023

(54) METHOD FOR TRANSMITTING HARQ-ACK INFORMATION, AND COMMUNICATION DEVICE

(71) Applicant: LG ELECTRONICS INC., Seoul (KR)

(72) Inventors: Hyunho Lee, Seoul (KR); Hanjun Park, Seoul (KR); Yunjung Yi, Seoul (KR); Seonwook Kim, Seoul (KR); Changhwan Park, Seoul (KR); Duckhyun Bae, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 437 days.

(21) Appl. No.: 17/280,850

(22) PCT Filed: Sep. 27, 2019

(86) PCT No.: PCT/KR2019/012567
§ 371 (c)(1),
(2) Date: Mar. 26, 2021

(87) PCT Pub. No.: WO2020/067754
PCT Pub. Date: Apr. 2, 2020

(65) Prior Publication Data
US 2022/0006570 A1 Jan. 6, 2022

(30) Foreign Application Priority Data

Sep. 27, 2018 (KR) .................. 10-2018-0115281
Feb. 15, 2019 (KR) .................. 10-2019-0017802
Jul. 4, 2019 (KR) .................. 10-2019-0080816
Sep. 18, 2019 (KR) .................. 10-2019-0114693

(51) Int. Cl.
*H04L 1/1812* (2023.01)
*H04W 72/21* (2023.01)
*H04W 72/543* (2023.01)

(52) U.S. Cl.
CPC .......... *H04L 1/1812* (2013.01); *H04W 72/21* (2023.01); *H04W 72/543* (2023.01)

(58) Field of Classification Search
CPC ... H04L 1/1812; H04L 1/0031; H04L 1/0026; H04L 1/1861; H04L 1/1671; H04L 1/1854; H04L 5/00; H04W 72/21; H04W 72/543
See application file for complete search history.

(56) References Cited

U.S. PATENT DOCUMENTS 11,700,608 B2 * 7/2023 Gao ...................... H04L 1/1819
370/329
2013/0121302 A1 5/2013 Yang et al.
(Continued)

OTHER PUBLICATIONS

PCT International Application No. PCT/KR2019/012567, International Search Report dated Jan. 28, 2020, 17 pages.
(Continued)

*Primary Examiner* — Jung H Park
(74) *Attorney, Agent, or Firm* — LEE, HONG, DEGERMAN, KANG & WAIMEY PC

(57) ABSTRACT

The present specification relates to a wireless communication system, and to a method and a device therefore, the method comprising: determining, in a state in which a first PUCCH resource related to a first UCI overlaps, in a time domain, a plurality of PUCCH resources related respectively to a plurality of HARQ-ACK payloads, a third PUCCH resource for multiplexing a first HARQ-ACK payload and the first UCI on the basis of the first UCI and the first HARQ-ACK payload related to one (a second PUCCH
(Continued)

resource) of the plurality of PUCCH resources; and transmitting the first HARQ-ACK payload and the first UCI on the third PUCCH resource.

13 Claims, 13 Drawing Sheets

(56) References Cited

U.S. PATENT DOCUMENTS

| | | | |
|---|---|---|---|
| 2020/0106546 A1* | 4/2020 | Takeda | H04W 72/21 |
| 2020/0288458 A1* | 9/2020 | Takeda | H04L 5/0057 |
| 2020/0358587 A1* | 11/2020 | Wang | H04L 1/1896 |
| 2020/0404653 A1* | 12/2020 | Matsumura | H04L 5/0055 |
| 2021/0218519 A1* | 7/2021 | Gou | H04W 72/0453 |
| 2021/0314105 A1* | 10/2021 | Gao | H04W 72/21 |

OTHER PUBLICATIONS

MediaTek Inc., "Remaining issues of short-PUCCH," 3GPP TSG RAN WG1 Meeting #93, R1-1806799, May 2018, 5 pages.
NTT Docomo Inc., "PUCCH structure in short-duration," 3GPP TSG RAN WG1 Meeting #93, R1-1807061, May 2018, 5 pages.
MediaTek Inc., "Remaining issues of long-PUCCH," 3GPP TSG RAN WG1 Meeting #92bis, R1-1804066, Apr. 2018, 9 pages.
Lenovo et al., "Multiplexing of different UCI types," 3GPP TSG RAN WG1 Meeting #92bis, R1-1804212, Apr. 2018, 5 pages.

* cited by examiner

METHOD FOR TRANSMITTING HARQ-ACK INFORMATION, AND COMMUNICATION DEVICE

CROSS-REFERENCE TO RELATED APPLICATIONS

This application is the National Stage filing under 35 U.S.C. 371 of International Application No. PCT/KR2019/012567, filed on Sep. 27, 2019, which claims the benefit of earlier filing date and right of priority to Korean Application Nos. 10-2018-0115281, filed on Sep. 27, 2018, 10-2019-0017802, filed on Feb. 15, 2019, 10-2019-0080816, filed on Jul. 4, 2019, and 10-2019-0114693, filed on Sep. 18, 2019, the contents of which are all hereby incorporated by reference herein in their entirety.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at any time and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Problem

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solution

As an aspect of the present disclosure, a method of transmitting hybrid automatic repeat request-acknowledgment (HARQ-ACK) information by a communication device in a wireless communication system is provided. The method comprises: in a state in which a first physical uplink control channel (PUCCH) resource associated with first uplink control information (UCI) overlaps with a plurality of PUCCH resources associated with a plurality of HARQ-ACK payloads in a time domain, determining a third PUCCH resource for multiplexing the first UCI and a first HARQ-ACK payload associated with a second PUCCH resource being one of the plurality of PUCCH resources, based on the first HARQ-ACK payload and the first UCI, and transmitting the first HARQ-ACK payload and the first UCI in the third PUCCH resource. The remaining HARQ-ACK payloads except for the first HARQ-ACK payload among the plurality of HARQ-ACK payloads are not transmitted in the third PUCCH resource.

As another aspect of the present disclosure, a communication device for transmitting HARQ-ACK information in a wireless communication system is provided. The communication device comprises at least one transceiver, at least one processor, and at least one computer memory operatively coupled to the at least one processor and storing instructions which when executed, cause the at least one processor to perform operations. The operations comprise: in a state in which a first PUCCH resource associated with first UCI overlaps with a plurality of PUCCH resources associated with a plurality of HARQ-ACK payloads in a time domain, determining a third PUCCH resource for multiplexing the first UCI and a first HARQ-ACK payload associated with a second PUCCH resource being one of the plurality of PUCCH resources, based on the first HARQ-ACK payload and the first UCI, and transmitting the first HARQ-ACK payload and the first UCI in the third PUCCH resource through the at least one transceiver. The remaining HARQ-ACK payloads except for the first HARQ-ACK payload among the plurality of HARQ-ACK payloads are not transmitted in the third PUCCH resource.

In each aspect of the present disclosure, the second PUCCH resource may be an earliest PUCCH resource among the plurality of PUCCH resources.

In each aspect of the present disclosure, the second PUCCH resource may be a PUCCH resource associated with a specific type of downlink channel among the plurality of PUCCH resources.

In each aspect of the present disclosure, the specific type of downlink channel may be a first type of channel between the first type of channel and a second type of channel. The first type of channel may have a lower quality of service (QoS) requirement than the second type of channel.

In each aspect of the present disclosure, in a state in which the third PUCCH resource overlaps with another PUCCH resource in the time domain, the plurality of HARQ-ACK payloads may be transmitted respectively in the plurality of PUCCH resources, while transmission of the first UCI in the first PUCCH resource may be dropped.

In each aspect of the present disclosure, the plurality of PUCCH resources may not overlap with each other in the time domain.

In each aspect of the present disclosure, the communication device may include an autonomous driving vehicle communicable with at least a user equipment (UE), a network, or another autonomous driving vehicle other than the communication device.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure.

MODE FOR INVENTION

Figure 1:
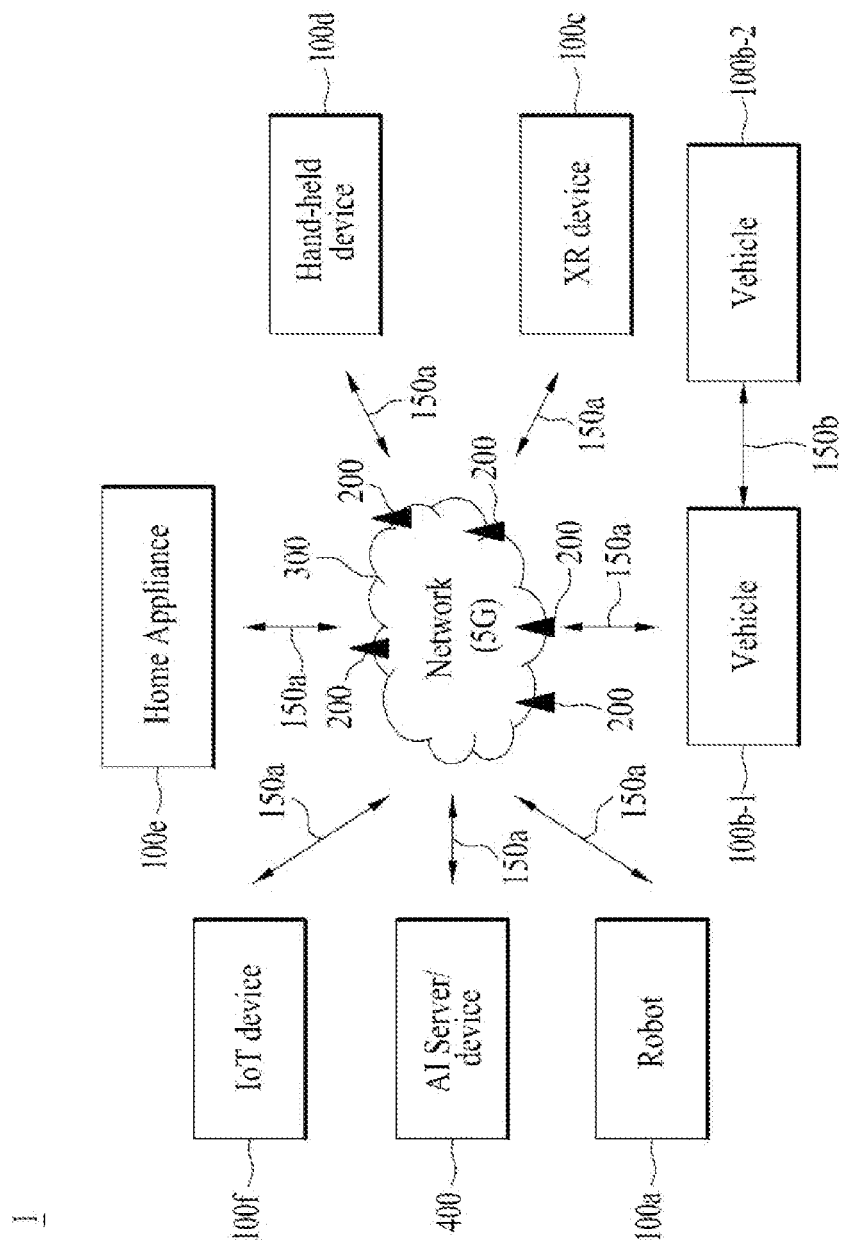
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PC-FICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUSCH/PUCCH/PRACH, respectively. In addition, the meaning of "the BS transmits/receives the PBCH/PDCCH/PDSCH" is that the BS transmits the broadcast information/DL data/DCI on or through a PBCH/PDCCH/PDSCH, respectively.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
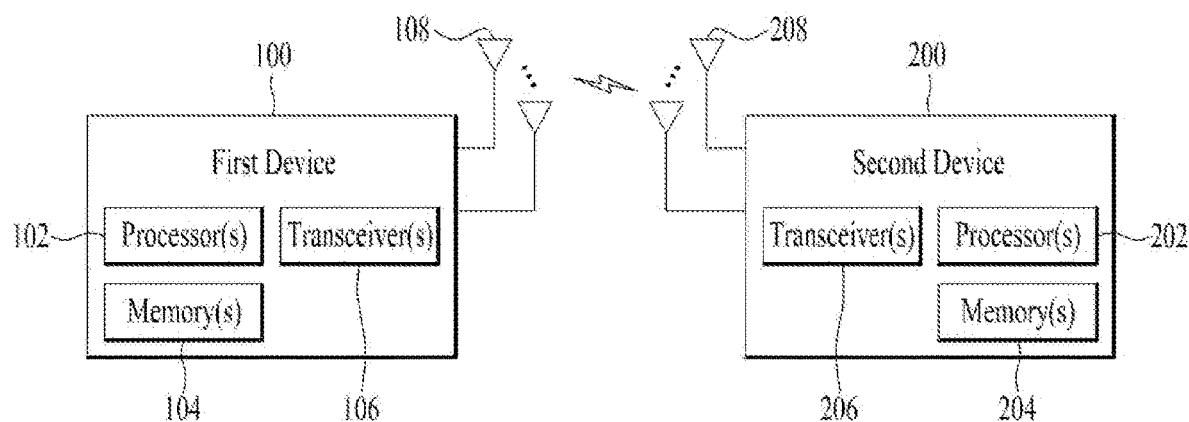
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the above-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the above-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the above-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the above-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
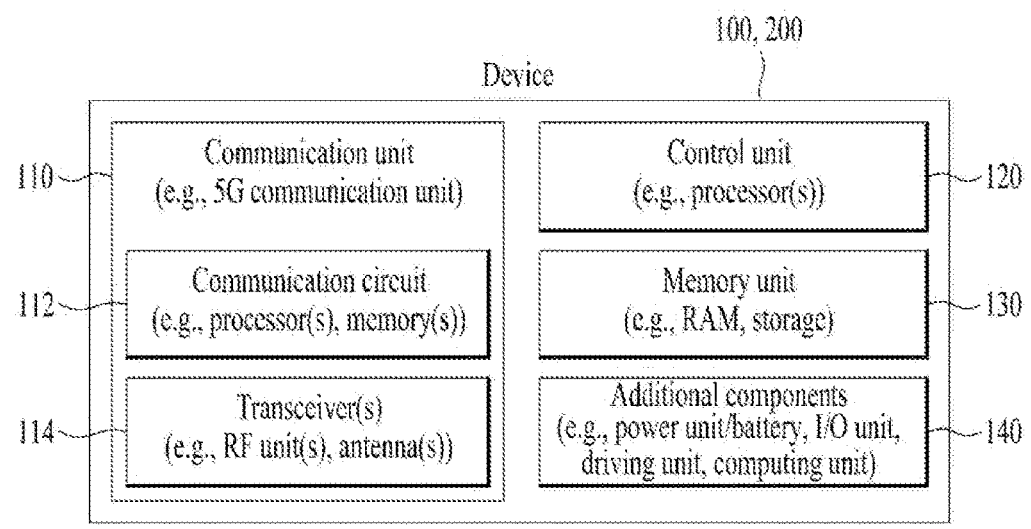
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

Figure 4:
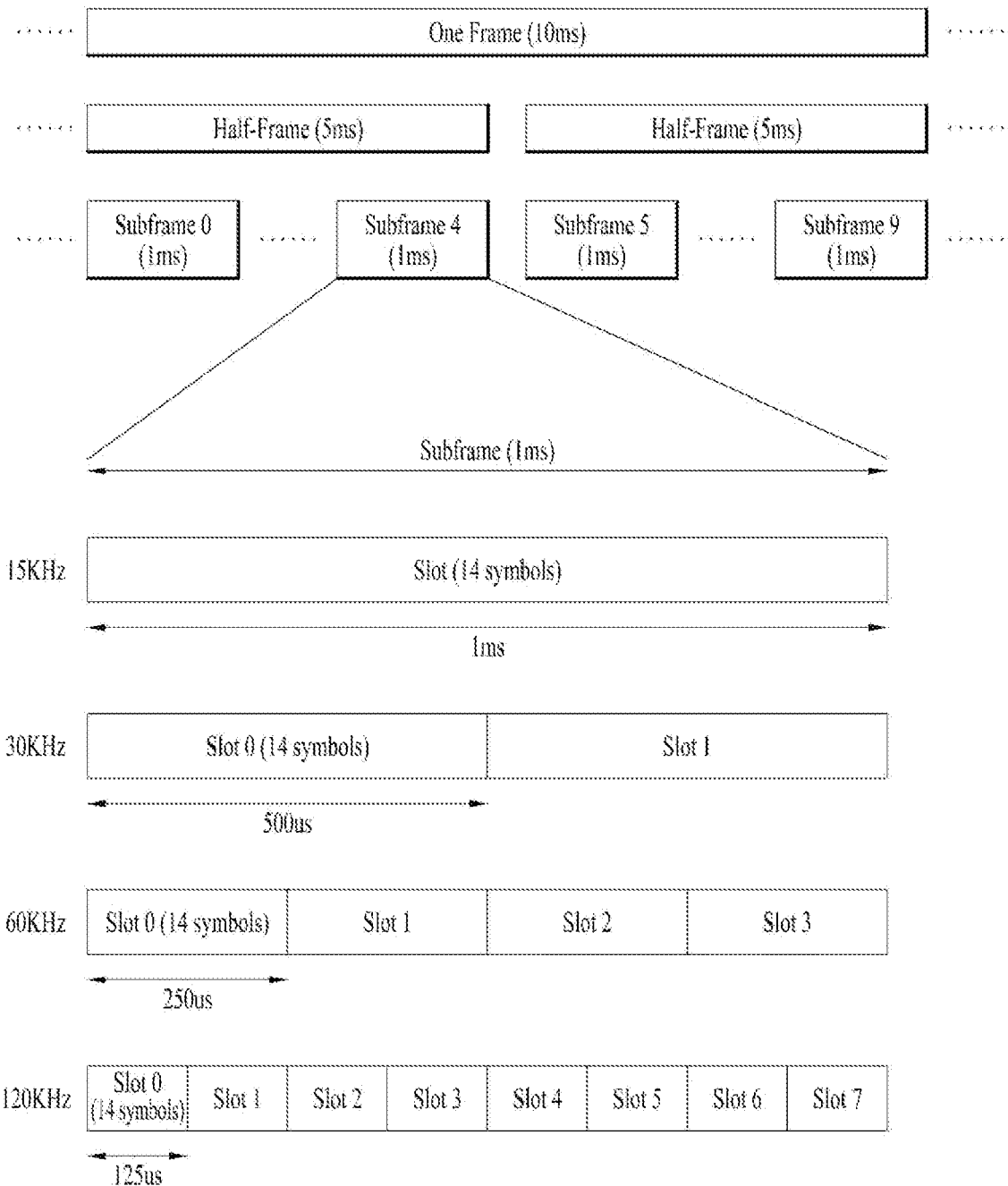
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix—OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably Referring to FIG. 4, in the NR system, UL and DL transmissions are organized into frames. Each frame has a duration of Tf=10 ms and is divided into two half-frames of 5 ms each. Each half-frame includes 5 subframes and a duration Tsf of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols (Nslotsymb) per slot, the number of slots (Nframe,uslot) per frame, and the number of slots (Nsubframe,uslot) per subframe.

TABLE 1

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | Nslotsymb | Nframe, uslot | Nsubframe, uslot |
|---|---|---|---|
| 2 | 12 | 40 | 4 |

Figure 5:
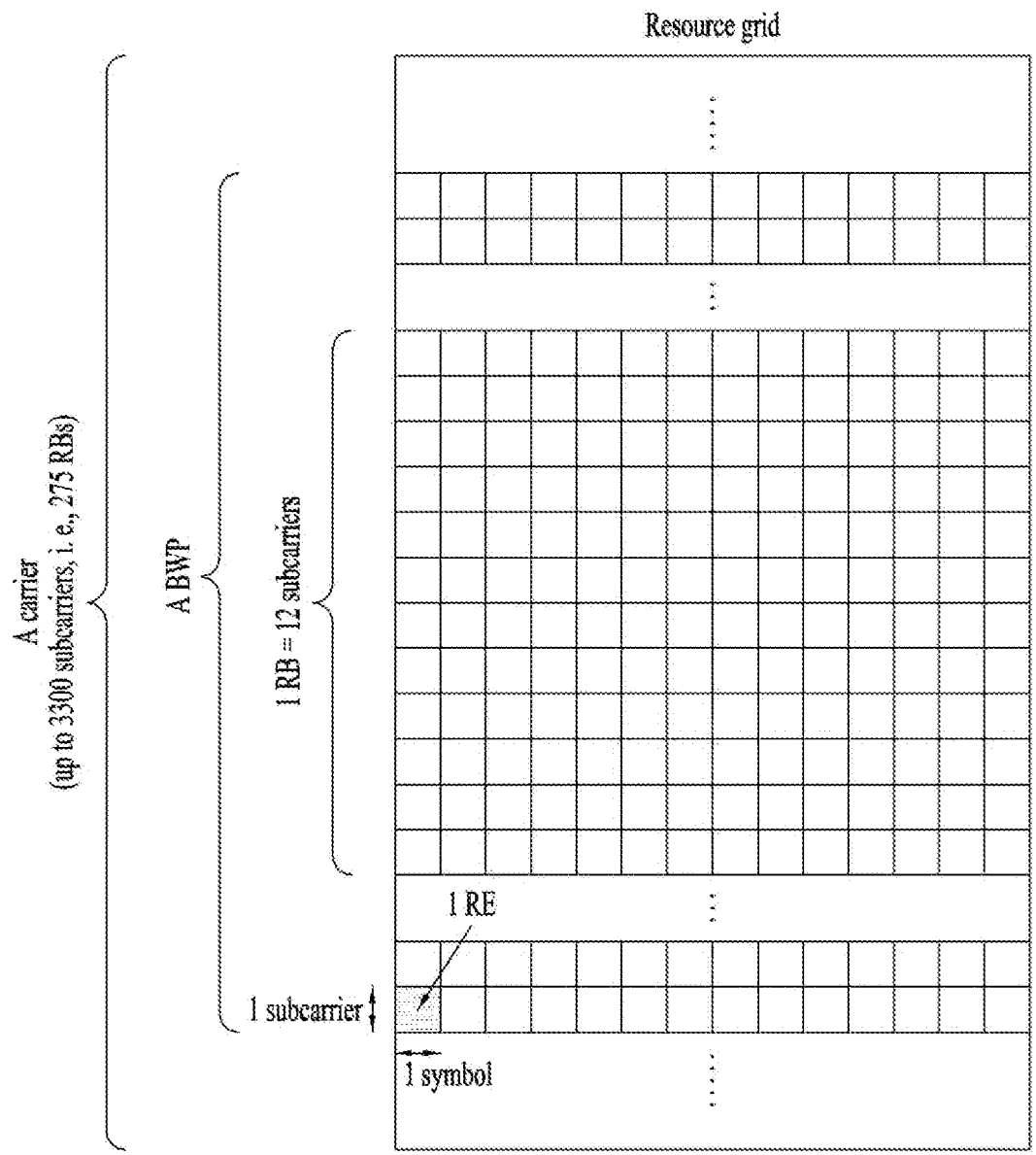
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of Nsize,ugrid,x*NRBsc subcarriers and Nsubframe,usymb OFDM symbols is defined, starting at a common resource block (CRB) Nstart,ugrid indicated by higher layer signaling (e.g. RRC signaling), where Nsize, ugrid,x is the number of resource blocks (RBs) in the resource grid and the subscript x is DL for downlink and UL for uplink. NRBsc is the number of subcarriers per RB. In the 3GPP-based wireless communication system, NRBsc is typically 12. There is one resource grid for a given antenna port p, a subcarrier spacing configuration u, and a transmission link (DL or UL). The carrier bandwidth Nsize,ugrid for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs are defined within a bandwidth part (BWP) and numbered from 0 to NsizeBWP,i−1, where i is a number of the BWP. The relation between a PRB nPRB in a BWP i and a CRB nCRB is given by: nPRB=nCRB+NsizeBWP,i, where NsizeBWP,i is a CRB in which the BWP starts relative to CRB 0. The BWP includes a plurality of consecutive RBs in the frequency domain. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration. The search space set is determined based on the following parameters provided by the BS to the UE.

- controlResourceSetId: Identifies a CORESET related to a search space set.
- monitoringSlotPeriodicityAndOffset: Indicates slots for PDCCH monitoring configured as a periodicity and an offset.
- monitoringSymbolsWithinSlot: Indicates the first symbol(s) for PDCCH monitoring in the slots for PDCCH monitoring.
- nrofCandidates: Indicates the number of PDCCH candidates for each CCE aggregation level.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

- Scheduling request (SR): Information that is used to request a UL-SCH resource.
- Hybrid automatic repeat request (HARQ)—acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.
- Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as an HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 3, (0) PUCCH Format 0 (PF0 or F0)
Supported UCI payload size: up to K bits (e.g., K=2)
Number of OFDM symbols constituting a single PUCCH: 1 to X symbols (e.g., X=2)
Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)
Supported UCI payload size: up to K bits (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 3

| PUCCH format | Length in OFDM symbols NPUCCHsymb | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, NUCI.-PUCCH resource set #0, if the number of UCI bits=<2

PUCCH resource set #1, if 2<the number of UCI bits=<N1

. . .

PUCCH resource set #(K−1), if NK−2<the number of UCI bits=<NK−1

Here, K represents the number of PUCCH resource sets (K>1) and Ni represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 3).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

The PUSCH delivers UL data (e.g., UL-SCH TB) and/or UCI and is transmitted based on a CP-OFDM waveform or a DFT-s-OFDM waveform. When the PUSCH is transmitted based on the DFT-s-OFDM waveform, the UE transmits the PUSCH by applying transform precoding. For example, when transform precoding is impossible (e.g., transform precoding is disabled), the UE transmits the PUSCH based on the CP-OFDM waveform, and when transform precoding is possible (e.g., transform precoding is enabled), the UE transmits the PUSCH based on the CP-OFDM waveform or the DFT-s-OFDM waveform. The PUSCH transmission may be scheduled dynamically by a UL grant in DCI or semi-statically by higher-layer (e.g., RRC) signaling (and/or layer 1 (L1) signaling (e.g., PDCCH)). A resource assignment scheduled semi-statically by higher-layer (e.g., RRC) signaling (and/or L1 (i.e., PHY) signaling) is referred to as a configured grant. The PUSCH transmission may be performed in a codebook-based or non-codebook-based manner.

Figure 6:
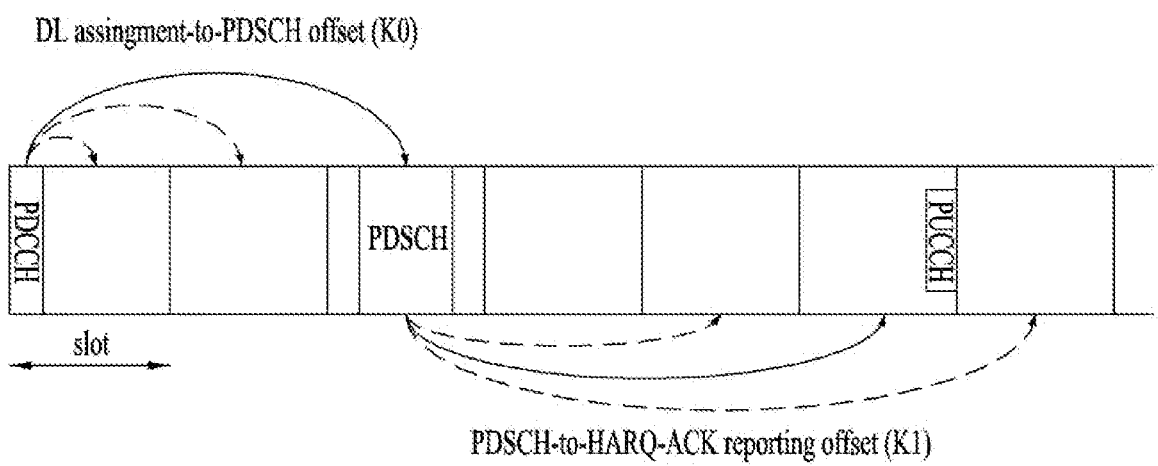
FIG. 6 illustrates a hybrid automatic repeat request-acknowledgement (HARQ-ACK) transmission/reception procedure.

FIG. 6 illustrates an HARQ-ACK transmission/reception procedure.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ feedback timing indicator: This indicator indicates K1.

Referring to FIG. 6, the UE may detect a PDCCH in slot #n. After the UE receives a PDSCH in slot #(n+K0) according to scheduling information received on the PDCCH, the UE may transmit UCI in slot #(n+K1) on a PUCCH. The UCI includes an HARQ-ACK response for the PDSCH. If the PDSCH is configured to transmit a maximum of one TB, an HARQ-ACK response may consist of one bit. If the PDSCH is configured to transmit a maximum of 2 TBs, the HARQ-ACK response may consist of 2 bits when spatial bundling is not configured and one bit when spatial bundling is configured. When an HARQ-ACK transmission timing for a plurality of PDSCHs is designated as slot #(n+K1), UCI transmitted in slot #(n+K1) includes an HARQ-ACK response for the plural PDSCHs.

Figure 7:
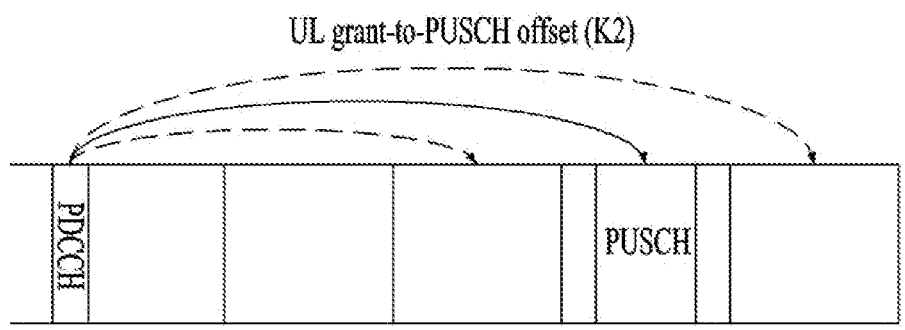
FIG. 7 illustrates an exemplary physical uplink shared channel (PUSCH) transmission/reception procedure.

FIG. 7 illustrates an exemplary PUSCH transmission/reception process. DCI (e.g., DCI format 0_0 and DCI format 0_1) carried on a PDCCH that schedules a PDSCH may include the following information.

Frequency domain resource assignment (FDRA): Indicates an RB set allocated to the PDSCH.

Time domain resource assignment (TDRA): Indicates a UL grant-to-PUSCH slot offset K2, the starting position (e.g., a symbol index S) and length (e.g., the number of symbols, L) of a PUSCH in a slot, and a PUSCH mapping type. The starting symbol S and the length L may be indicated by a start and length indicator (SLIV), or separately. PUSCH mapping type A or PUSCH mapping type B may be indicated by the TDRA. In PUSCH mapping type A, the DMRS is located in the third symbol (symbol #2) or the fourth symbol (symbol #3) of a slot. In PUSCH mapping type B, the DMRS is located in the first symbol allocated to the PUSCH.

Referring to FIG. 7, the UE may detect a PDCCH in slot #n. Then, the UE may transmit a PUSCH in slot #(n+K2) according to scheduling information received on the PDCCH in slot #n. The PUSCH includes a UL-SCH TB.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be permitted to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

UCI: UCI implies control information that the UE transmits on UL. The UCI includes multiple types of control information (i.e., UCI types). For example, the UCI may include HARQ-ACK (shortly, A/N or AN), SR, and/or CSI.

UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.

UCI/data multiplexing: UCI/data multiplexing may mean an operation of transmitting UCI and data on a common physical UL channel (e.g., PUSCH). UCI/data multiplexing may include an operation of multiplexing UCI with data. For convenience, the multiplexed UCI is referred to as MUX UCI/data. Further, UCI/data multiplexing may include an operation performed in relation to MUX UCI/data. For example, UCI/data multiplexing may include a process of determining a UL channel resource to transmit MUX UCI/data.

Slot: Slot means a basic time unit or time interval for data scheduling. A slot includes a plurality of symbols. Here, a symbol may be an OFDM-based symbol (e.g., a CP-OFDM symbol or DFT-s-OFDM symbol).

Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 8:
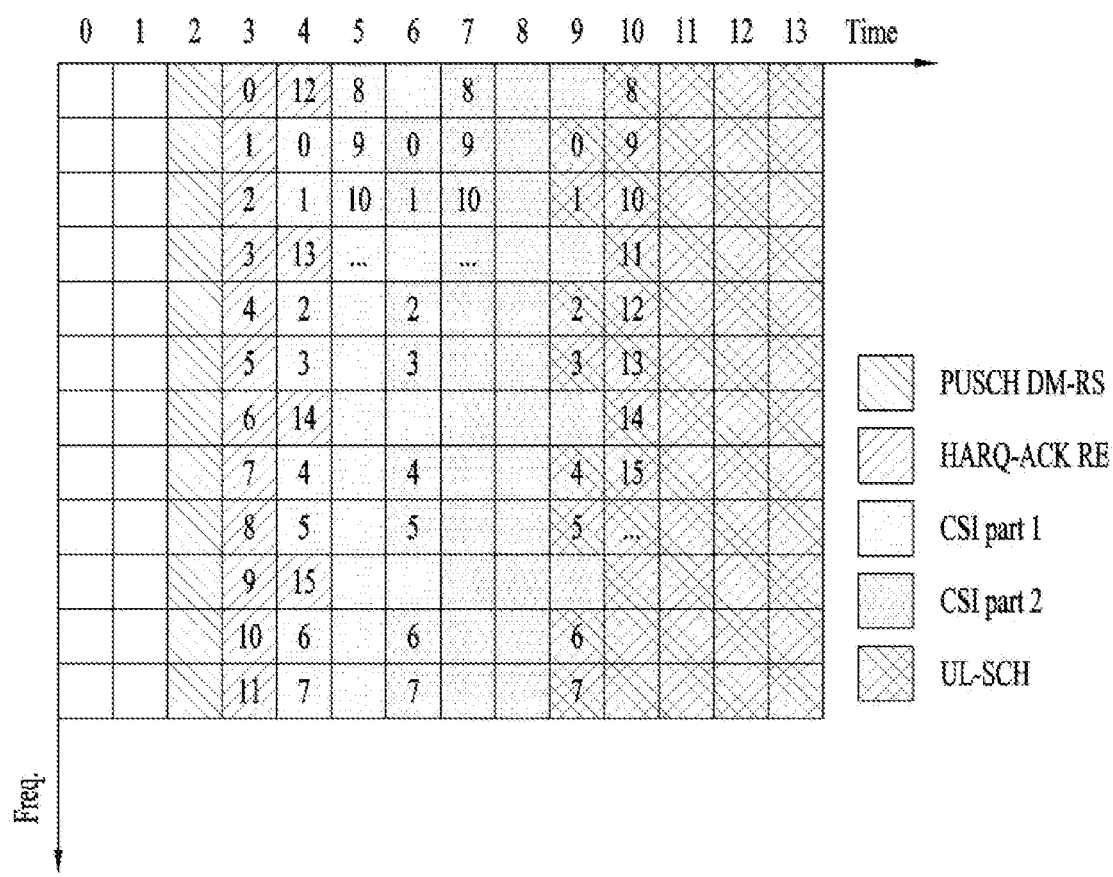
FIG. 8 illustrates an example of multiplexing uplink control information (UCI) with a PUSCH.

FIG. 8 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 8 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 9:
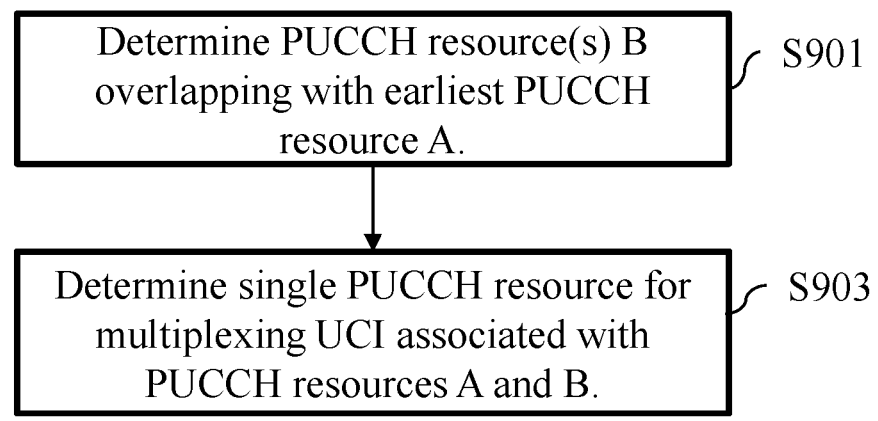
FIG. 9 illustrates an example of a process for a UE with overlapping physical uplink control channels (PUCCHs) in a single slot to handle collision between UL channels.

FIG. 9 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S901). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S903). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 10:
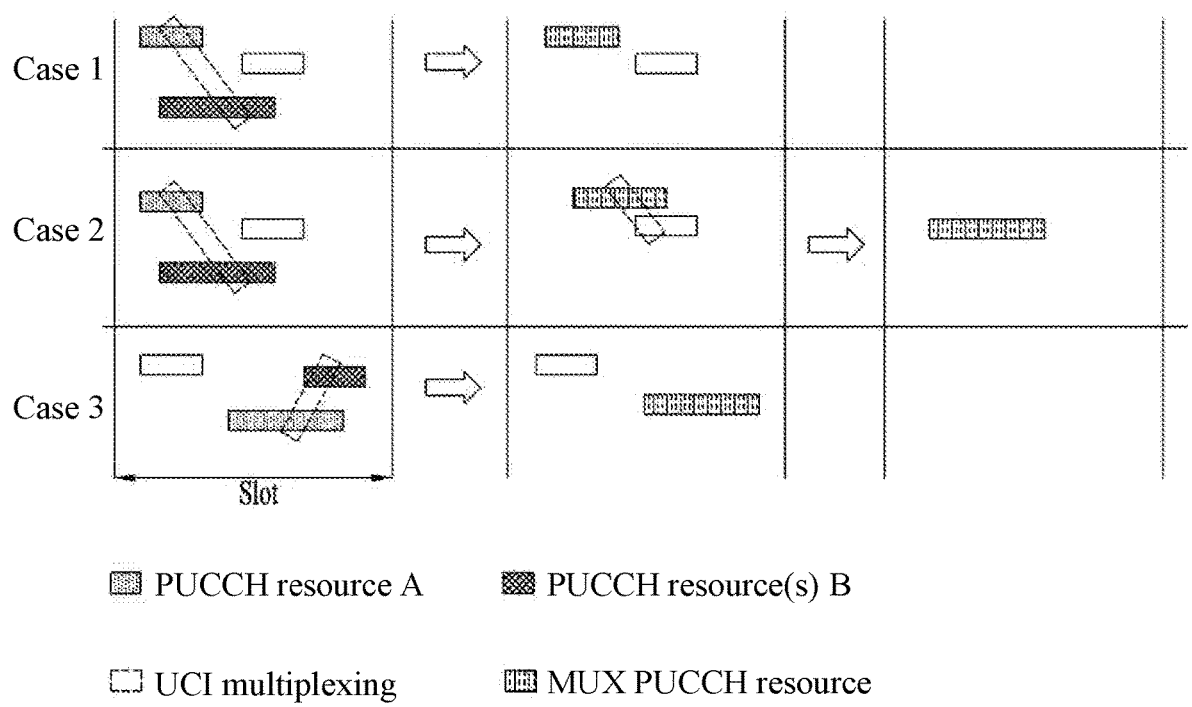
FIG. 10 illustrates cases for performing UCI multiplexing based on FIG. 12.

FIG. 10 illustrates cases for performing UCI multiplexing based on FIG. 9. Referring to FIG. 10, when a plurality of PUCCH resources overlap in a slot, UCI multiplexing may be performed based on the earliest PUCCH resource A (e.g., PUCCH resource A with the earliest start symbol). In FIG. 10, Case 1 and Case 2 show that the first PUCCH resource overlaps with another PUCCH resource. In this case, the process of FIG. 9 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 9 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 9 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 11:
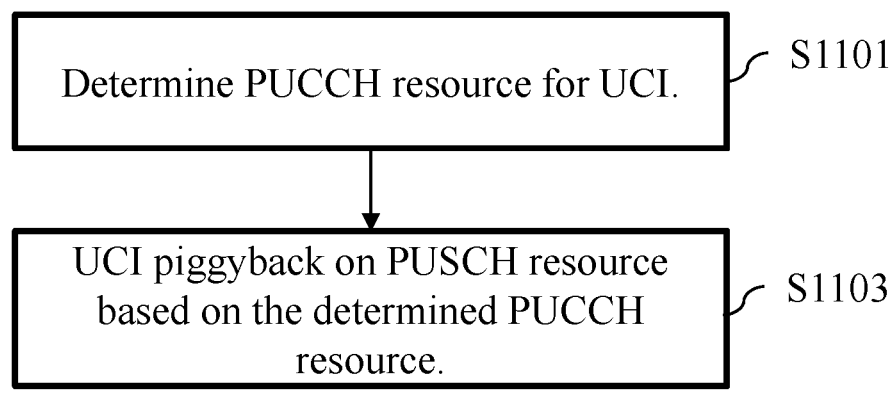
FIG. 11 illustrates a process for a UE with an overlapping PUCCH and PUSCH in a single slot to handle collision between UL channels.

FIG. 11 illustrates a process for a UE with an overlapping PUCCH and PUSCH in a single slot to handle collision between UL channels.

To transmit UCI, the UE may determine a PUCCH resource (S1101). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1103). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 12:
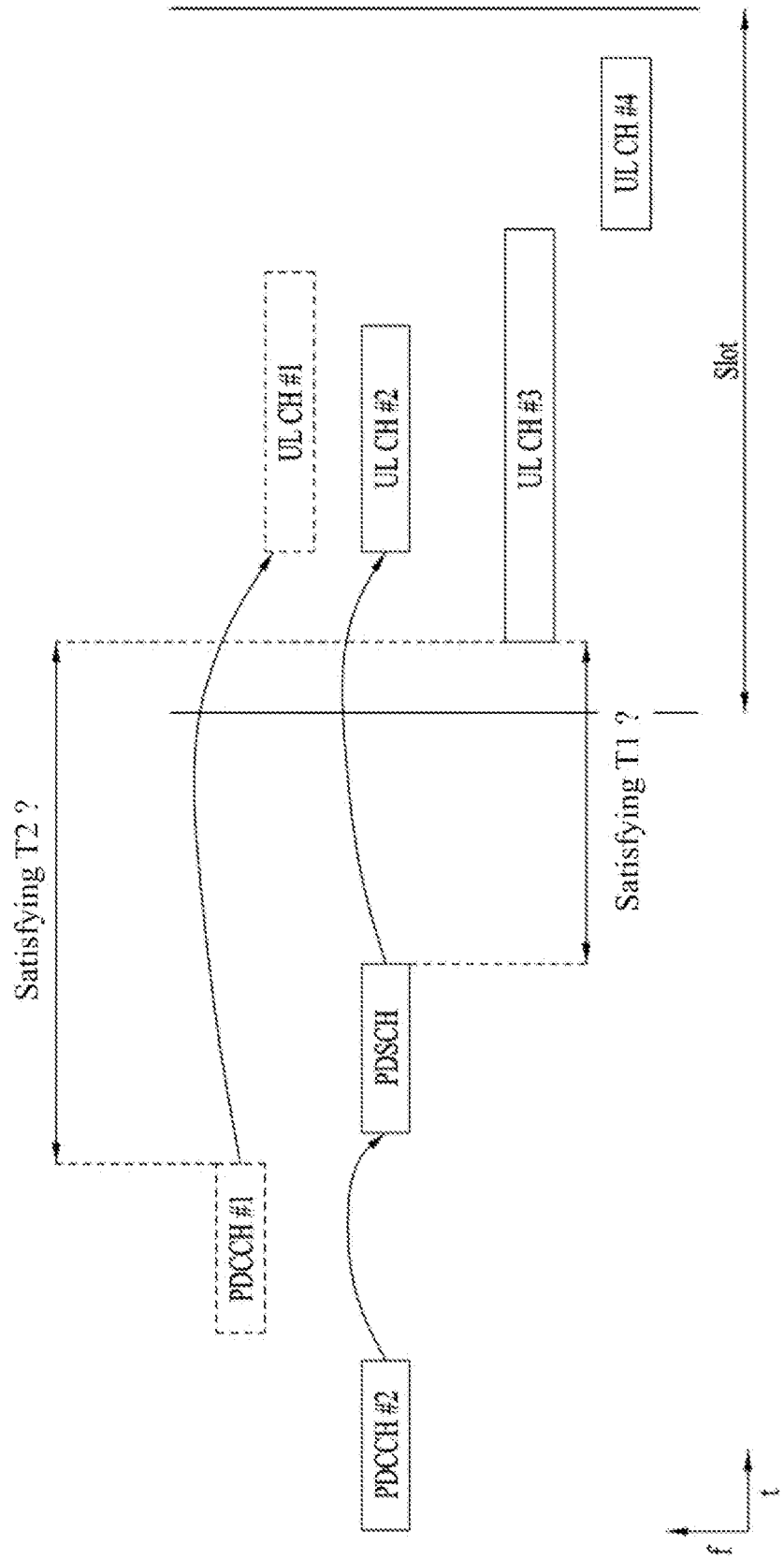
FIG. 12 illustrates UCI multiplexing considering a timeline condition.

FIG. 12 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time N1+ from the start symbol of the earliest channel among the overlapping PUCCH(s) and/or PUSCH(s) (on the time axis). T1 may be determined based on i) a minimum PDSCH processing time N1 defined according to a UE processing capability, and/or ii) d1 predefined as an integer equal to or greater than 0 according to a scheduled symbol position, a DMRS position in the PUSCH, BWP switching, etc.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) d2 predefined as an integer equal to or greater than 0 according to the scheduled symbol position, BWP switching, etc.

Tables below show processing times according to UE processing capability. Particularly, Table 4 shows a PDSCH processing time for PDSCH processing capability #1 of the UE, Table 5 shows a PDSCH processing time for PDSCH processing capability #2 of the UE, Table 6 shows a PUSCH preparation time for PDSCH processing capability #1 of the UE, and Table 7 shows a PUSCH processing time for PDSCH processing capability #2 of the UE.

TABLE 4

| u/SCS | PDSCH decoding time N1 [symbols] | |
| --- | --- | --- |
| | Front-loaded DMRS only | Front-loaded + additional DMRS |
| 0/15 kHz | 8 | 13 |
| 1/30 kHz | 10 | 13 |
| 2/60 kHz | 17 | 20 |
| 3/120 kHz | 20 | 24 |

TABLE 5

| u/SCS | PDSCH decoding time N1 [symbols] | |
| --- | --- | --- |
| | Front-loaded DMRS only | Front-loaded + additional DMRS |
| 0/15 kHz | 3 | [13] |
| 1/30 kHz | 4.5 | [13] |
| 2/60 kHz | 9 for frequency range 1 | [20] |

TABLE 6

| u/SCS | PUSCH preparation time N2 [symbols] |
| --- | --- |
| 0/15 kHz | 10 |
| 1/30 kHz | 12 |
| 2/60 kHz | 23 |
| 3/120 kHz | 36 |

TABLE 7

| u/SCS | PUSCH preparation time N2 [symbols] |
| --- | --- |
| 0/15 kHz | 5 |
| 1/30 kHz | 5.5 |
| 2/60 kHz | 11 for frequency range 1 |

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 9 to 11 may be UL channels that satisfy the multiplexing timeline condition(s). Referring to FIG. 12, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

Figure 13:
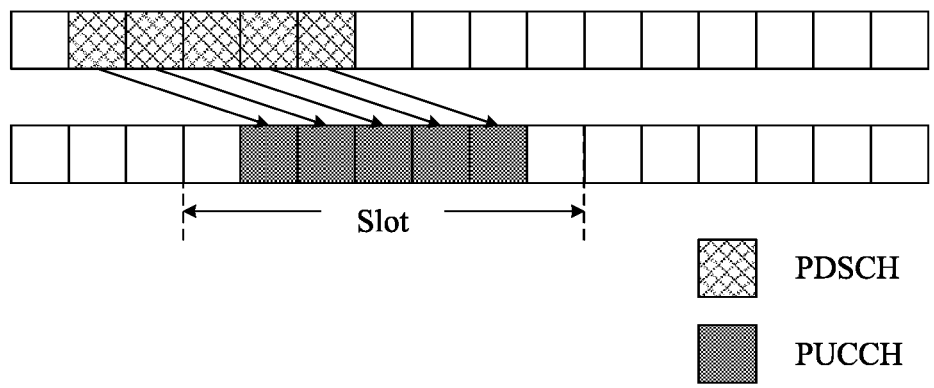
FIG. 13 illustrates exemplary transmissions of a plurality of HARQ-ACK PUCCHs in a slot.

FIG. 13 illustrates exemplary transmissions of a plurality of HARQ-ACK PUCCHs in a slot.

The current NR standard document (e.g., 3GPP TS 38.213 V15.2.0) regulates that a UE does not expect to transmit more than one PUCCH carrying HARQ-ACK information in a slot. Therefore, according to the current NR standard document, the UE is allowed to transmit at most one PUCCH with HARQ-ACK information in one slot. To prevent a situation in which the UE cannot transmit HARQ-ACK information due to the limitation of the number of HARQ-ACK PUCCHs that the UE is allowed to transmit, the BS should perform DL scheduling such that HARQ-ACK information is multiplexed in one PUCCH resource. However, considering a service with a strict latency and reliability requirement such as URLLC service, concentrating a plurality of HARQ-ACK feedbacks only on one PUCCH in a slot may not be preferable in terms of PUCCH performance. Moreover, to support a latency-critical service, the BS may have to schedule a plurality of consecutive PDSCHs having a short duration in one slot. Even though the UE may transmit a PUCCH in any symbol(s) in a slot according to a configuration/indication of the BS, when the UE is allowed to transmit only one HARQ-ACK PUCCH in the slot, fast back-to-back scheduling of PDSCHs at the BS and fast HARQ-ACK feedback at the UE are impossible. Therefore, for more flexible and efficient resource use and service support, it is preferable to allow a plurality of (mutually non-overlapping) HARQ-ACK PUCCHs (or PUSCHs) to be transmitted in one slot as illustrated in FIG. 13.

Figure 14:
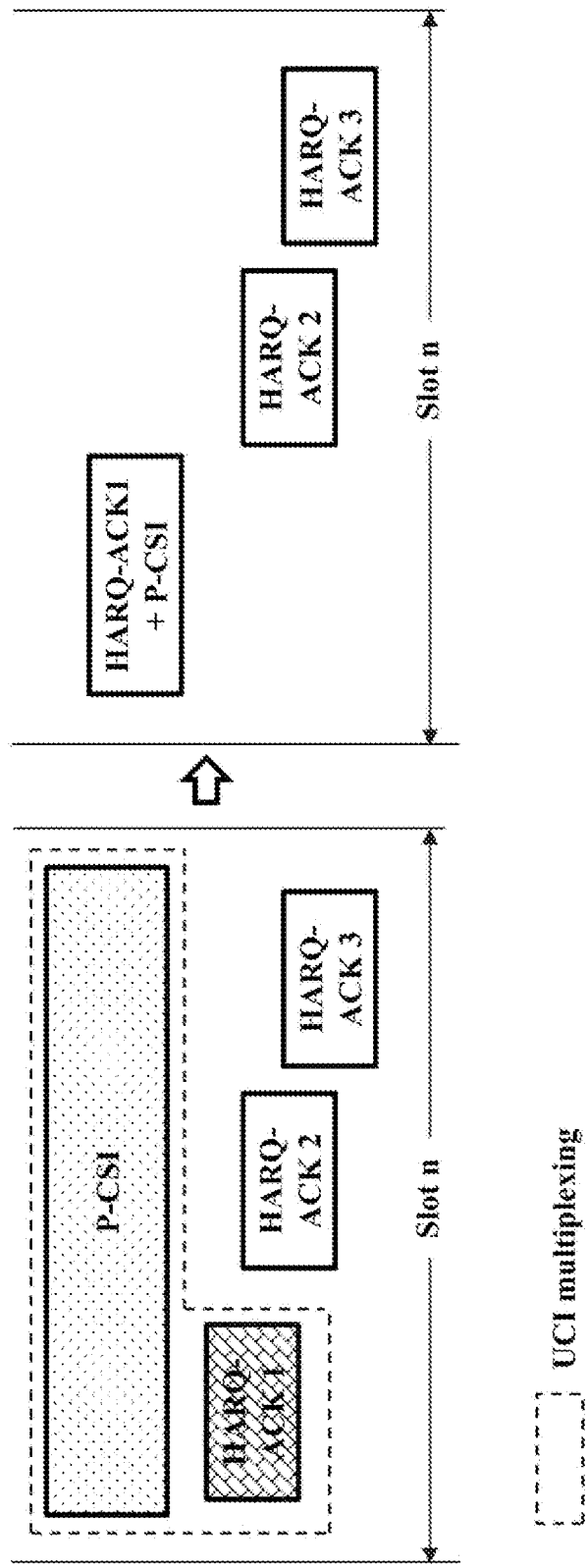
FIG. 14 illustrates exemplary UL transmission according to the present disclosure, when a PUCCH overlaps with a plurality of HARQ-ACK PUCCHs (which do not overlap with each other) on the time axis.

FIG. 14 illustrates exemplary UL transmission according to the present disclosure, when a PUCCH overlaps with a plurality of (mutually non-overlapping) HARQ-ACK PUCCHs on the time axis. Particularly, FIG. 14 illustrates a UCI multiplexing method, when mutually non-overlapping PUCCHs overlap with another PUCCH. Hereinafter, the other PUCCH overlapping with the plurality of (mutually non-overlapping) PUCCHs is referred to as a long PUCCH.

When the transmission durations of a plurality of UL channels (resources) (e.g., a plurality of PUCCH resources) corresponding to a plurality of HARQ-ACK transmissions in a slot overlap with the transmission duration of a long PUCCH (resource) on the time axis, the UE may operate according to the following example(s). While the present disclosure is described in the context of HARQ-ACK by way of example, the implementations of the present disclosure may be applied to other UCI (e.g., an SR and CSI). In the present disclosure, when it is said that a plurality of channels overlap with each other, this may imply that the transmission durations of the plurality of channels belonging to the same carrier and/or different carriers overlap with each other in the time domain.

(1) Option 1: If UCI of all PUCCH resources overlapping with a long PUCCH resource is transmitted together in a new resource, rapid HARQ-ACK feedback for back-to-back scheduling of the BS is not possible. Moreover, the performance of a corresponding (new) PUCCH carrying all of the UCI associated with the overlapping PUCCH resources may also be degraded due to an increase in a total payload. Therefore, it may be preferable to consider multiplexing between the long PUCCH and only some of a plurality of HARQ-ACK transmissions. In Option 1 of the present disclosure, therefore, the UE transmits the HARQ-ACK of an HARQ-ACK PUCCH that first overlaps with the long PUCCH among the plurality of HARQ-ACKs and UCI of the long PUCCH in the new PUCCH resource. For example, the UE may determine a PUCCH resource set for the new resource based on a total payload size corresponding to the first HARQ-ACK overlapping with the long PUCCH and the UCI of the long PUCCH, and determine a final number of PRBs for the new resource by using the total payload size and a maximum coding rate. Referring to FIG. 14, when there are HARQ-ACK1 (PUCCH), HARQ-ACK2 (PUCCH), and HARQ-ACK3 (PUCCH) corresponding respectively to a plurality of (mutually non-overlapping) HARQ-ACK transmissions overlapping with a long PUCCH containing periodic CSI (P-CSI), the UE determines a new PUCCH resource (i.e., MUX PUCCH resource) which will contain the P-CSI and UCI based on HARQ-ACK1, and transmits the P-CSI and HARQ-ACK1 in the new PUCCH resource, without multiplexing HARQ-ACK2 and HARQ-ACK3 in the new PUCCH resource. (If the PUCCH of HARQ-ACK2 and the PUCCH of HARQ-ACK3 do not overlap with the new PUCCH resource on the time axis), the UE may transmit HARQ-ACK2 and HARQ-ACK3 in their respective original PUCCH resources other than the new PUCCH resource.

(2) Option 2: The UE transmits, in the new PUCCH resource, the UCI of the long PUCCH and an HARQ-ACK corresponding to a specific target service and/or quality of service (QoS) and/or BLER requirement and/or reliability requirement and/or latency requirement and/or processing time among the plurality of HARQ-ACKs overlapping with the long PUCCH. For example, when among HARQ-ACK 1, HARQ-ACK 2 and HARQ-ACK 3 in FIG. 14, HARQ-ACK2 is a (first) HARQ-ACK corresponding to the specific target service, and/or QoS and/or BLER requirement and/or reliability requirement and/or latency requirement and/or processing time, HARQ-ACK2 and the P-CSI may be transmitted in the new PUCCH resource. Since the reliability of the HARQ-ACK multiplexed with the other PUCCH will be relatively decreased, compared to the HARQ-ACKs that are not multiplexed with the other PUCCH, the HARQ-ACK multiplexed with the other PUCCH may be preferably a relatively low-priority HARQ-ACK. In Option 2, therefore, an HARQ-ACK corresponding to a specific target service and/or QoS and/or BLER requirement and/or reliability requirement and/or latency requirement and/or processing time may mean an HARQ-ACK corresponding to a lower-priority target service and/or QoS and/or BLER requirement and/or reliability requirement and/or latency requirement and/or processing time. The UE may determine a PUCCH resource set for the new resource based on a total payload size corresponding to the UCI of the long PUCCH and the HARQ-ACK corresponding to the specific target service and/or QoS and/or BLER requirement and/or reliability requirement and/or latency requirement and/or processing time, and determine a final number of PRBs for the new resource by using the total payload size and a maximum coding rate.

When applying Option 2 or Option 3, the UE may operate based on the following rule(s).

- It may be regulated that the UE does not expect overlap between the new (PUCCH) resource and another PUCCH resource in time and/or frequency. Alternatively, when the new (PUCCH) resource overlaps with another PUCCH resource in time and/or frequency, the UE may determine a new resource based on a UCI payload until there is no overlap between the PUCCHs. Alternatively, when the new (PUCCH) resource overlaps with another PUCCH resource in time and/or frequency, the UE may transmit only the plurality of HARQ-ACKs, dropping the long PUCCH (i.e., without the need for determining the new resource).
- It may be regulated that the UE does not expect the PUCCH transmission in the new resource to require a shorter processing time than a processing time supported by a UE capability. Alternatively, when the PUCCH transmission in the new resource requires a shorter processing time than the processing time supported by the UE capability, the UE may transmit only the plurality of HARQ-ACKs, dropping the long PUCCH (i.e., without the need for determining the new resource).
- When for the HARQ-ACK, the PUCCH transmission in the new resource is later than the original HARQ-ACK transmission of the HARQ-ACK, for example, when the new PUCCH resource in which the HARQ-ACK is multiplexed follows the original PUCCH resource of the HARQ-ACK in the time domain, this may not be preferable in terms of latency. To prevent transmission of the HARQ-ACK in the new PUCCH resource later than the original HARQ-ACK transmission, the UE may transmit only the plurality of HARQ-ACKs, dropping the long PUCCH (i.e., without the need for determining the new resource) even though the new PUCCH resource does not overlap with another PUCCH resource.

When the long PUCCH contains a specific UCI type (or CSI part 2), it may be regulated that the UE transmits only the plurality of HARQ-ACKs, dropping the long PUCCH.

The above rules may also be applied in a similar manner to a short PUCCH other than a long PUCCH. For example, when a short PUCCH overlaps with a plurality of (mutually non-overlapping) PUCCHs on the time axis, the above rules may apply.

The above rules have been described in the context of a long PUCCH overlapping with a plurality of HARQ-ACK transmissions. However, the rules may also be applied, when a channel other than a long PUCCH, corresponding to a specific (e.g., lower-priority) target service and/or QoS and/or BLER requirement and/or reliability requirement and/or latency requirement and/or processing time overlaps with a plurality of (mutually non-overlapping) HARQ-ACKs. For example, when the transmission durations of a plurality of UL channels (resources) corresponding to a plurality of HARQ-ACKs in a slot overlap on the time axis with the transmission duration of a channel corresponding to a specific target service and/or QoS and/or BLER requirement and/or reliability requirement and/or latency requirement and/or processing time, the above rules may apply.

In particular, when at least one of the plurality of HARQ-ACKs corresponds to the specific target service and/or QoS and/or BLER requirement and/or reliability requirement and/or latency requirement and/or processing time, the above rules may apply. Alternatively, when HARQ-ACK feedback transmissions are allowed in a plurality of PUCCH resources in a slot, the above rules may apply. For example, when a slot is divided into a plurality of sub-slots in the time domain and sub-slot-based HARQ feedbacks are configured, the above rules may apply.

Now, a description will be given of Option 1 to Option 4 from the perspective of the BS. When the transmission durations of a plurality of UL channels (resources) (e.g., a plurality of PUCCH resources) corresponding to a plurality of HARQ-ACK transmissions in a slot overlap with the transmission duration of a long PUCCH (resource) on the time axis, the BS may operate according to the following example(s). While the present disclosure is described in the context of HARQ-ACK by way of example, the implementations of the present disclosure may be applied to other UCI (e.g., an SR and CSI). In the present disclosure, when it is said that a plurality of channels overlap with each other, this may imply that the transmission durations of the plurality of channels belonging to the same carrier and/or different carriers overlap with each other in the time domain.

(1) Option 1: When UCI of all PUCCH resources overlapping with a long PUCCH resource is transmitted together in a new resource, rapid HARQ-ACK feedback for back-to-back scheduling of the BS is not possible. Moreover, the performance of a corresponding (new) PUCCH carrying all of the UCI associated with the overlapping PUCCH resources may also be degraded due to an increase in a total payload. Therefore, it may be preferable to consider multiplexing between a long PUCCH and only some of a plurality of HARQ-ACK transmissions. In Option 1 of the present disclosure, therefore, the BS may perform decoding, expecting that the UE transmits the HARQ-ACK of an HARQ-ACK PUCCH that first overlaps with the long PUCCH among the plurality of HARQ-ACKs and UCI of the long PUCCH in the new PUCCH resource. For example, the BS may receive and decode a new PUCCH, expecting that the UE determines a PUCCH resource set for the new resource based on a total payload size corresponding to the first HARQ-ACK overlapping with the long PUCCH and the UCI of the long PUCCH, and determines a final number of PRBs for the new resource by using the total payload size and a maximum coding rate.

(2) Option 2: The BS may receive the new PUCCH, expecting that the UE transmits, in the new PUCCH resource, the UCI of the long PUCCH and an HARQ-ACK corresponding to a specific target service and/or QoS and/or BLER requirement and/or reliability requirement and/or latency requirement and/or processing time among the plurality of HARQ-ACKs overlapping with the long PUCCH. For example, when among HARQ-ACK 1, HARQ-ACK 2 and HARQ-ACK 3 in FIG. 14, HARQ-ACK2 is a (first) HARQ-ACK corresponding to the specific target service and/or QoS and/or BLER requirement, and/or reliability requirement and/or latency requirement and/or processing time, the BS may receive and decode HARQ-ACK2 and the P-CSI in the new PUCCH resource, expecting that the UE transmits HARQ-ACK2 and the P-CSI in the new PUCCH resource. Since the reliability of the HARQ-ACK multiplexed with the other PUCCH will be relatively decreased, compared to the HARQ-ACKs that are not multiplexed with the other PUCCH, the HARQ-ACK multiplexed with the other PUCCH may be preferably a relatively low-priority HARQ-ACK. In Option 2, therefore, the HARQ-ACK corresponding to the specific target service and/or QoS and/or BLER requirement, and/or reliability requirement and/or latency requirement and/or processing time may mean an HARQ-ACK corresponding to a lower-priority target service and/or QoS and/or BLER requirement, and/or reliability requirement and/or latency requirement and/or processing time.

When applying Option 2 or Option 3, the BS may operate based on the following rule(s).

The BS may perform scheduling such that the new (PUCCH) resource does not overlap with another PUCCH resource in time and/or frequency. Alternatively, when the new (PUCCH) resource overlaps with another PUCCH resource in time and/or frequency, the BS may expect that the UE determines a new resource based on a UCI payload until there is no overlap between the PUCCHs. Alternatively, when the new (PUCCH) resource overlaps with another PUCCH resource in time and/or frequency, the BS may receive and decode the plurality of HARQ-ACKs, expecting that the UE transmits only the plurality of HARQ-ACKs, dropping the long PUCCH (i.e., without determining the new resource).

The BS may perform scheduling such that the PUCCH transmission in the new resource does not require a shorter processing time than a processing time supported by a UE capability. Alternatively, when the PUCCH transmission in the new resource requires a shorter processing time than the processing time supported by the UE capability, the BS may receive and decode the plurality of HARQ-ACKs, expecting that the UE transmits only the plurality of HARQ-ACKs, dropping the long PUCCH (i.e., without determining the new resource).

When for the HARQ-ACK, the PUCCH transmission in the new resource is later than the original HARQ-ACK transmission of the HARQ-ACK, for example, when the new PUCCH resource in which the HARQ-ACK is multiplexed follows the original PUCCH resource of the HARQ-ACK in the time domain, this may not be preferable in terms of latency. To prevent transmission of the HARQ-ACK in the new PUCCH resource later than the original HARQ-ACK transmission, the BS may receive and decode the plurality of HARQ-ACKs, expecting that the UE transmits only the plurality of HARQ-ACKs, dropping the long PUCCH (i.e., without the need for determining the new resource) even though the new PUCCH resource does not overlap with another PUCCH resource.

When the long PUCCH contains a specific UCI type (or CSI part 2), the BS may receive and decode the plurality of HARQ-ACKs, expecting that the UE transmits only the plurality of HARQ-ACKs, dropping the long PUCCH.

The above rules may also be applied in a similar manner to a short PUCCH other than a long PUCCH. For example, when a short PUCCH overlaps with a plurality of (mutually non-overlapping) PUCCHs on the time axis, the above rules may apply.

The above rules have been described in the context of a long PUCCH overlapping with a plurality of HARQ-ACK transmissions. However, the rules may also be applied, when a channel other than a long PUCCH, corresponding to a specific (e.g., lower-priority) target service and/or QoS and/or BLER requirement and/or reliability requirement and/or latency requirement and/or processing time overlaps with a plurality of (mutually non-overlapping) HARQ-ACKs. For example, when the transmission durations of a plurality of UL channels (resources) corresponding to a plurality of HARQ-ACKs in a slot overlap on the time axis with the transmission duration of a channel corresponding to a specific target service and/or QoS and/or BLER requirement and/or reliability requirement and/or latency requirement and/or processing time, the above rules may apply.

In particular, when at least one of the plurality of HARQ-ACKs corresponds to the specific target service and/or QoS and/or BLER requirement and/or reliability requirement and/or latency requirement and/or processing time, the above rules may apply. Alternatively, when HARQ-ACK feedback transmissions are allowed in a plurality of PUCCH resources in a slot, the above rules may apply. For example, when a slot is divided into a plurality of sub-slots in the time domain and sub-slot-based HARQ feedbacks are configured, the above rules may apply.

In the present disclosure, the target service and/or QoS and/or BLER requirement and/or reliability requirement and/or latency requirement and/or processing time of a specific channel/UCI may be configured by a higher-layer signal, indicated explicitly or implicitly by a specific field of DCI, or identified by a search space to which a PDCCH (that schedules DL/UL data) belongs, identified by a control resource set (CORESET) to which the PDCCH (that schedules DL/UL data) belongs, identified by a DCI format, or identified by CRC masking of the PDCCH. The example(s) of the present disclosure may also be applied to handling of a plurality of types of channels/UCI identified by a specific field of DCI, a search space to which a PDCCH belongs, a CORESET to which the PDCCH belongs, an RNTI, a DCI format, or CRC masking of the PDCCH, without explicit indication of the target service and/or QoS and/or BLER requirement and/or reliability requirement and/or latency requirement and/or processing time of the specific channel/UCI. The examples of the present disclosure may apply by replacing "UCI channel corresponding to a specific target service and/or QoS and/or BLER requirement and/or reliability requirement and/or latency requirement and/or processing time and/or UCI type" with "specific UCI/channel identified by a specific field of DCI, a search space to which a PDCCH belongs, a CORESET to which the PDCCH belongs, an RNTI, a DCI format, or CRC masking of the PDCCH, among a plurality of types of UCI/channels".

Figure 15:
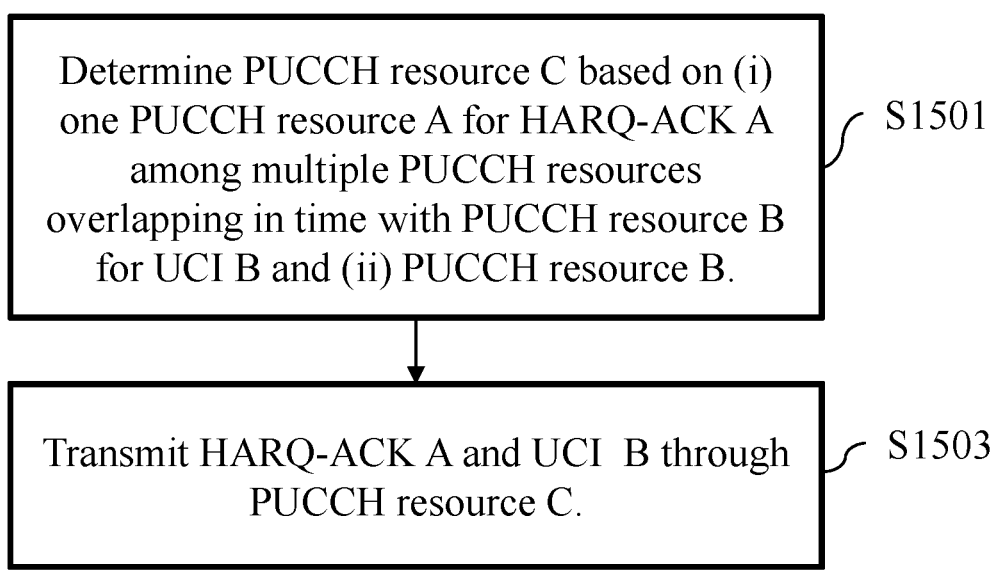
FIG. 15 illustrates an exemplary method of transmitting a UL signal by a communication device according to an example of the present disclosure.

FIG. 15 illustrates an exemplary method of transmitting a UL signal by a communication device according to an example of the present disclosure.

Referring to FIG. 15, the communication device may receive DL channels (e.g., PDSCHs) and determine PUCCH resources for HARQ-ACK transmissions for the respective DL channels. In the present disclosure, a PUCCH resource for a PUCCH transmission triggered/configured/indicated by a DL channel is referred to as an HARQ-ACK resource.

When a plurality of HARQ-ACK PUCCH resources (which do not overlap with each other on the time axis) overlap with another PUCCH resource (hereinafter, referred to as PUCCH resource B) in the time domain, the communication device may determine, based on one (hereinafter, referred to as PUCCH resource A) of the plurality of HARQ-ACK PUCCH resources and PUCCH resource B, a new PUCCH resource (hereinafter, referred to as PUCCH resource C) in which HARQ-ACK information (hereinafter, referred to as HARQ-ACK A) to be transmitted on a PUCCH of HARQ-ACK PUCCH resource A is to be multiplexed with UCI (hereinafter, referred to as UCI B) to be carried on a PUCCH of PUCCH resource B (S1501). For example, the communication device may determine the new PUCCH resource and the total number of PRBs for the new PUCCH resource based on the total size of payload of UCI including HARQ-ACK A and UCI B. For example, the communication device may determine a PUCH resource set for accommodating the total payload based on HARQ-ACK A and UCI B from among PUCCH resource sets available to the communication device and determine a PUCCH resource indicated by a related PRI as PUCCH resource C from among the PUCCH resources of the determined PUCCH resource set. The communication device may determine the total number of PRBs for PUCCH resource C based on the total payload and a maximum coding rate related to PUCCH resource C.

The communication device may multiplex HARQ-ACK A and UCI B in PUCCH resource C. For example, the communication device may transmit a PUCCH containing HARQ-ACK A and UCI B in PUCCH resource C (S1503). The communication device does not multiplex the remaining HARQ-ACK payloads except for HARQ-ACK A among HARQ-ACK payloads related to the plurality of respective HARQ-ACK resources, in PUCCH resource C. In other words, the communication device does not transmit the remaining HARQ-ACK payloads in PUCCH resource C.

The earliest of the plurality of HARQ-ACK PUCCH resources on the time axis may be used as PUCCH resource A.

Among the plurality of HARQ-ACK PUCCH resources, a PUCCH resource for HARQ-ACK information corresponding to a specific target service and/or QoS and/or BLER requirement and/or reliability requirement and/or latency requirement and/or processing time may be used as PUCCH resource A.

When PUCCH resource C overlaps with another PUCCH resource in time and/or frequency, the transmission device may determine a PUCCH resource based on the UCI payload until there is no overlap between the PUCCHs. Alternatively, when PUCCH resource C overlaps with another PUCCH resource in time and/or frequency, the communication device performs the PUCCH transmissions in the plurality of respective PUCCH resources, dropping the PUCCH transmission of PUCCH resource B (i.e., the transmission of UCI B). In other words, when PUCCH resource C overlaps with another PUCCH resource in time and/or frequency, the communication device may transmit the respective HARQ-ACK payloads in the plurality of respective PUCCH resources, dropping the PUCCH resource in PUCCH resource B (i.e., the transmission of UCI B) (without determining PUCCH resource C). PUCCH resource B may be dropped, when the PUCCH of PUCCH resource B includes a specific UCI type.

When PUCCH resource B overlaps with the plurality of HARQ-ACK PUCCH resources on the time axis, and when PUCCH resource B is for a PUCCH transmission corresponding to a specific (e.g., lower-priority) target service and/or QoS and/or BLER requirement and/or reliability requirement and/or latency requirement and/or processing time, the communication device may determine PUCCH resource C based on HARQ-ACK information of one of the plurality of HARQ-ACK PUCCH resources and UCI B of PUCCH resource B.

The communication device of the present disclosure includes at least one processor; and at least one computer memory operatively coupled to the at least one processor and storing instructions which when executed, cause the at least one processor to perform operations according to the example(s) of the present disclosure.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

The invention claimed is:

1. A method of transmitting hybrid automatic repeat request-acknowledgment (HARQ-ACK) information by a communication device in a wireless communication system, the method comprising:
   in a state in which a first physical uplink control channel (PUCCH) resource associated with first uplink control information (UCI) overlaps with a plurality of PUCCH resources associated with a plurality of HARQ-ACK payloads in a time domain, determining a third PUCCH resource for multiplexing the first UCI and a first HARQ-ACK payload associated with a second PUCCH resource being one of the plurality of PUCCH resources, based on the first HARQ-ACK payload and the first UCI; and
   transmitting the first HARQ-ACK payload and the first UCI in the third PUCCH resource,
   wherein the remaining HARQ-ACK payloads except for the first HARQ-ACK payload among the plurality of HARQ-ACK payloads are not transmitted in the third PUCCH resource.

2. The method according to claim 1, wherein the second PUCCH resource is an earliest PUCCH resource among the plurality of PUCCH resources.

3. The method according to claim 1, wherein the second PUCCH resource is a PUCCH resource associated with a specific type of downlink channel among the plurality of PUCCH resources.

4. The method according to claim 3, wherein the specific type of downlink channel is a first type of channel between the first type of channel and a second type of channel, and
   wherein the first type of channel has a lower quality of service (QoS) requirement than the second type of channel.

5. The method according to claim 1, further comprising:
   in a state in which the third PUCCH resource overlaps with another PUCCH resource in the time domain, transmitting the plurality of HARQ-ACK payloads respectively in the plurality of PUCCH resources, while dropping transmission of the first UCI in the first PUCCH resource.

6. The method according to claim 1, wherein the plurality of PUCCH resources do not overlap with each other in the time domain.

7. A communication device for transmitting hybrid automatic repeat request-acknowledgment (HARQ-ACK) information in a wireless communication system, the communication device comprising:
   at least one transceiver;
   at least one processor; and
   at least one computer memory operatively coupled to the at least one processor and storing instructions which when executed, cause the at least one processor to perform operations comprising:
   in a state in which a first physical uplink control channel (PUCCH) resource associated with first uplink control information (UCI) overlaps with a plurality of PUCCH resources associated with a plurality of HARQ-ACK payloads in a time domain, determining a third PUCCH resource for multiplexing the first UCI and a first HARQ-ACK payload associated with a second PUCCH resource being one of the plurality of PUCCH resources, based on the first HARQ-ACK payload and the first UCI; and
   transmitting the first HARQ-ACK payload and the first UCI in the third PUCCH resource through the at least one transceiver, and
   wherein the remaining HARQ-ACK payloads except for the first HARQ-ACK payload among the plurality of HARQ-ACK payloads are not transmitted in the third PUCCH resource.

8. The communication device according to claim 7, wherein the second PUCCH resource is an earliest PUCCH resource among the plurality of PUCCH resources.

9. The communication device according to claim 7, wherein the second PUCCH resource is a PUCCH resource associated with a specific type of downlink channel among the plurality of PUCCH resources.

10. The communication device according to claim 9, wherein the specific type of downlink channel is a first type of channel between the first type of channel and a second type of channel, and wherein the first type of channel has a lower quality of service (QoS) requirement than the second type of channel.

11. The communication device according to claim 7, wherein the operations further comprise:

in a state in which the third PUCCH resource overlaps with another PUCCH resource in the time domain, transmitting the plurality of HARQ-ACK payloads respectively in the plurality of PUCCH resources, while dropping transmission of the first UCI in the first PUCCH resource.

12. The communication device according to claim 7, wherein the plurality of PUCCH resources do not overlap with each other in the time domain.

13. The communication device according to claim 7, wherein the communication device includes an autonomous driving vehicle communicable with at least a user equipment (UE), a network, or another autonomous driving vehicle other than the communication device.

\* \* \* \* \*